United States Patent [19]

Hwo

[11] Patent Number: 4,528,220
[45] Date of Patent: Jul. 9, 1985

[54] PLASTIC BAGS FOR MEDICAL SOLUTIONS AND BLOOD

[75] Inventor: Charles C. Hwo, Sugar Land, Tex.

[73] Assignee: Shell Oil Company, Houston, Tex.

[21] Appl. No.: 578,739

[22] Filed: Feb. 9, 1984

[51] Int. Cl.³ .............................................. B65D 30/08
[52] U.S. Cl. ...................................... 428/35; 604/408;
428/515; 428/516; 428/347; 428/213; 383/109;
264/176 R
[58] Field of Search ............... 604/408, 409, 410, 212,
604/262; 138/DIG. 24; 383/109, 113, 116;
428/35, 515, 516, 213, 347; 264/176 R

[56] References Cited

U.S. PATENT DOCUMENTS

| | | | |
|---|---|---|---|
| 3,472,369 | 10/1969 | Schuster | 206/63.2 |
| 4,119,267 | 10/1978 | Kydonieus | 229/53 |
| 4,125,662 | 11/1978 | Weiner et al. | 428/213 |
| 4,169,910 | 10/1979 | Graboski | 383/116 |
| 4,252,851 | 2/1981 | Lansbury et al. | 428/397 |
| 4,339,493 | 7/1982 | Weiner | 428/516 |
| 4,339,494 | 7/1982 | Weiner | 428/516 |
| 4,339,495 | 7/1982 | Weiner | 428/516 |
| 4,339,497 | 7/1982 | Weiner | 428/516 |
| 4,339,498 | 7/1982 | Weiner | 428/516 |
| 4,391,862 | 7/1983 | Bornstein et al. | 428/516 |

Primary Examiner—John E. Kittle
Assistant Examiner—James J. Seidleck
Attorney, Agent, or Firm—Jennifer R. Daunis

[57] ABSTRACT

A package for blood and/or intravenous solutions which is nontoxic, autoclavable, retains its strength when dropped, sufficiently flexible and is of substantially reduced material cost which comprises an outer layer blend of propylene-ethylene copolymer and butene-1-ethylene copolymer, which is laminated to an inner layer blend of butene-1-ethylene copolymer and propylene-ethylene copolymer. The copolymers are random and the thickness ratio of the inner layer blend to the outer layer blend is 4:1.

19 Claims, 6 Drawing Figures

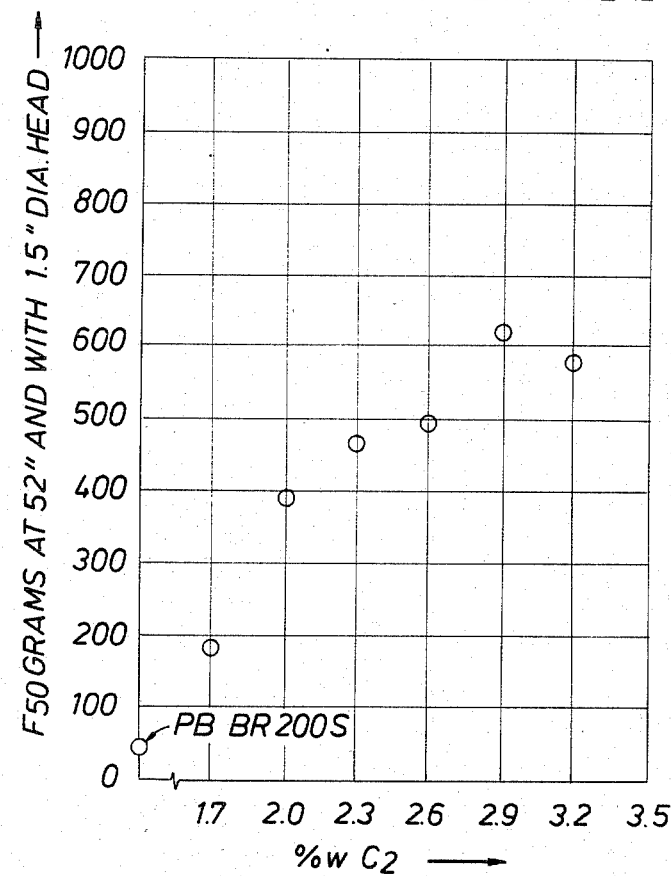
FIG. 4 ETHYLENE CONTENT V. SEAL DROP TEST
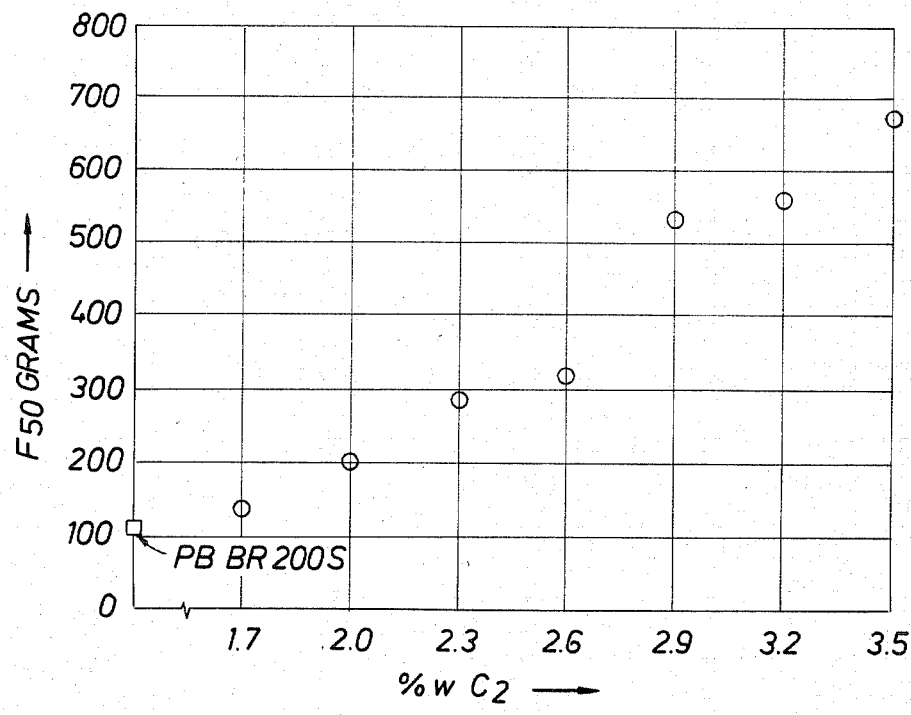
FIG. 5 ETHYLENE CONTENT V. FILM DROP TEST

PLASTIC BAGS FOR MEDICAL SOLUTIONS AND BLOOD

BACKGROUND OF THE INVENTION

The present invention relates generally to improved packages and particularly to improved packages for containing blood and/or intravenous solutions such as saline, dextrose or glucose and which are made of sufficient amounts of materials which lend desirable film thickness as well as strength which is unaffected when the package is subjected to autoclaving and drop tests.

Various packages and bags have been developed over the years for retaining items which are to be sterilized by steam autoclaving after packaging. These bags typically comprise a plastic sheet material and a membrane permeable to sterilizing vapors such as ethylene oxide or steam. For example, U.S. Pat. Nos. 3,472,369 and 3,761,013 disclose bags consisting generally of a plastic sheet folded along longitudinal fold lines to define a longitudinal opening. The opening is covered by a readily removable, vapor-permeable closure membrane typically in the form of a paper strip. It has been found that when such bags are made large enough to hold bulky, relatively heavy materials, such as blood or saline solution, the stress that is developed when the bag is filled may result in rupturing of the seals joining the plastic sheet material and paper membrane. This problem is particularly aggravated when the filled bag is subjected to steam sterilization—autoclaving—which, by itself, effectuates a weakening of the membrane.

Heretofore, blood and intravenous solution containers were made from glass and were then superceded by containers made from polyvinyl chloride (hereinafter referred to as "PVC"). There is a great deal of dissatisfaction with PVC containers because large amounts of plasticizers and vinylchloride monomers leach and/or hydrolyze into the blood and/or intravenous solutions contained in PVC bags and ultimately find their way into humans and animals being treated. The containers made of a polyvinyl chloride formulation include as an ester-type plasticizer, di-2-ethylhexylphthalate. This system of storage of blood and blood components results in a surprisingly low plasma hemogloben content after, for example, 21 days of storage however, each year more and more concern surfaces from various sources with regard to the potential undesirability of the plasticizer leaching from the plastic material and entering the blood stream, from where it is infused to the patient upon infusion of the blood or blood components. This concern also includes possible long-term and subtle effects of the PVC. Even now, Canada has prohibited the use of the PVC package for containing intravenous solutions because of the long term harmful effects attributable to PVC.

Various plastic formulations which are flexible, sterilizable at autoclavable temperatures, free from liquid plasticizers capable of leaching, as well as those which exhibit high strength and impact resistance have been tested as blood bag materials. Polypropylene, used alone is too brittle and is known to break on impact from drop tests.

A material for use in making blood and/or intravenous solution packages should have the following properties:

(1) The package should be readily processable—the material should process readily into film or sheet by conventional extrusion techniques. Preferably, the film should be of less thickness than that of the present plasticized PVC film (0.015 inches). The film should not be subject to blocking, in film form, to any extent which would interfere with container fabrication. The material should show no significant tendency, in film form, to develop or maintain electrostatic charges during fabrication, filling, storage or use of the container. In addition, the material should mold readily into fittings or other parts by ordinary injection molding. Port components should be of the same material as the bag to satisfy requirements due to the contact between the material and the solution or blood. Material should also be readily heat sealable by conventional or impulse heat methods or by dielectric (RF) methods.

(2) The material should possess high contact clarity versus packaged solutions.

(3) The material should have a minimal effect (less than 0.5 unit) upon the pH of non-buffered fluids, such as pure water, during manufacture and through the shelf life of the product.

(4) The material should show minimal visually noticeable color after fabrication, filling and sterilization of the container.

(5) The materials should show no cracking upon flexing due to storage, shipment and handling at temperatures 5° C. to 40° C. (41° F. to 104° F.).

(6) The material should show no tendency toward environmental stress or rupture under conditions of fabrication, storage and use.

(7) The material should readily accept printing, by either a stamp or flexigraphic process.

(8) The material should be stable toward ordinary light, natural and artificial, at levels encountered during usual product storage conditions. The material should also exhibit long-term stability with general physical, chemical and biological properties essentially unchanged, of no less than (4) years under warehouse storage conditions, as supplied or in molded part or extruded sheet form, not in contact with solutions and must be stable for warehousing. In addition, the material should possess acceptable stability toward ionizing radiation of up to 2.5 Mrad.

Most Important Tests (9) The material should be of sufficient flexibility in film thickness required so that the film thickness is kept to a minimum. A low density is preferable.

(10) The material should be highly impact resistant and not show a tendency toward embrittlement when heat sealed. This is measured by drop testing of the finished bag from 8 feet to validate the integrity of the seal. Acceptable tensile strength should be achieved at 25° C. and the material should be scuff resistant.

(11) The material should be biologically inert (non-toxic) and contain no plasticizers or other nonpolymer components in major amounts. The material should contain a minimum of additives such as stabilizers, lubricants, etc. and should not contain exudable or migratory ingredients under fabrication, sterilization, storage or use conditions.

(12) The material should be able to withstand autoclaving at temperatures up to 121° C. (saturated steam) for 30 minutes without failure of heat seals, distortion, shrinkage or other evidence of degradative change. The material should not blush under autoclave conditions.

(13) The material should show no greater levels of extractable material by typical hospital solutions, than the following:

total extractable (water): 0.009 mg/cm$^2$;
chloroform extractable (other solutions): 0.005 mg/cm$^2$:

The material should acceptably pass extraction tests for oxidizable substances (permanganate tests).

(14) The material should show a low water vapor transmission rate (WVTR) of not more than 0.2 grams per 100 square inches per day, should show minimal water absorption, and should possess no unpleasant odor.

PVC does not pass Test No. 11, which is probably the most important one, since long term effects of hydrolyzation and leaching into blood or intravenous solutions of the PVC are not yet known.

U.S. Pat. No. 4,119,267 teaches that the only commercially available materials which will withstand autoclaving at 240° F. to 270° F. (Test No. 12) are Mylar, Nylon, polycarbonates, polysulfones, some polyurethanes, some silicones, cellulose, cellulose triacetate, fluorinated ethylene, polytetrafluoroethylene, polyflurochloroethylene and polyvinyl alcohol. '267 provides for two single sheets of material, one of which is an overwrap made of the PVC which can be autoclaved at the above temperatures, but the other one an intravenous bag which is made of material which may not be successfully subjected to autoclaving. As well as not meeting tests No. 4, 5, 6 and 7 of '267 (Test 4—soft to the hand, Test 5—capable of withstanding a drop test of 6' when full, Test 6—suitable for heat sealing and Test 7—a price which is not prohibitive). Thus, '267 teaches away from the use of any material other than those listed above in the specification of '267.

Nylon has good autoclavable properties but shows flex cracking, is brittle, stiff and the water vapor transmission rate is too high. Polyethylene terephthalate (PET) likewise suffers from the same disadvantages.

The use of polybutylene by itself has been evaluated for medical solution packages, but it has not been successful in passing either the autoclave or drop impact tests. Butylene-ethylene copolymers do not pass the autoclavability requirement and although polypropylene will withstand the autoclave temperature, its flexibility and drop impact resistance are not adequate. Certain blends of the butylene-ethylene copolymers with propylene or with polypropylene and polybutylene meet all of the anticipated requirements for the medical solution package. This is achieved through lamination (coextrusion) of two layers of the mentioned blends at different blending compositions to optimize certain properties in each individual layer in order to achieve an even more satisfactory product for the application. In addition, the particular material blend of this invention results in a substantial reduction of material cost.

SUMMARY OF THE INVENTION

This invention is of a package for containing blood and/or intravenous solutions which meets all of the above tests, particularly those of non-toxicity, autoclavability, strength when dropped, and desirable film thickness. The package preferably comprises an outer layer blend of propylene-ethylene copolymer and butene-1-ethylene copolymer which is laminated to an inner layer blend of butene-1-ethylene copolymer and propylene-ethylene copolymer. The thickness ratio of the inner layer blend to the outer layer blend is preferably about 4:1.

BRIEF DESCRIPTION OF THE DRAWINGS

FIG. 4 is a Table showing the relationship between ethylene content and seal drop test results. All data is based on 2 mil blown film.

FIG. 5 is a Table showing the relationship between ethylene content and film drop test results. All data is based on 2 mil blown film.

DETAILED DESCRIPTION OF THE PREFERRED EMBODIMENTS

Figure 1:
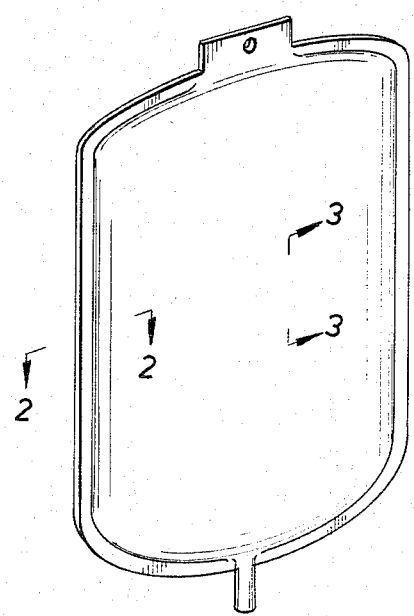
FIG. 1 is a front view of the package as it is hung for use as a container of blood and/or intravenous solutions.

FIG. 1 is a front view of the package as it is hung for use as a container of blood and/or intravenous solutions.

Figure 2:
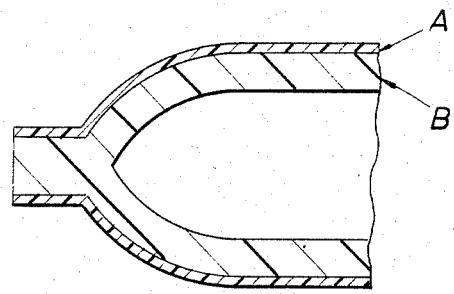
FIG. 2 is a side view of the outer layer blend of polymers which is laminated to the inner layer blend of polymers and which shows the layer structure at the sealed portion of the package.

FIG. 2 is a side view of the outer layer blend of polymers which is laminated to the inner layer blend of polymers and which shows the layer structure at the sealed portion of the package.

Figure 3:
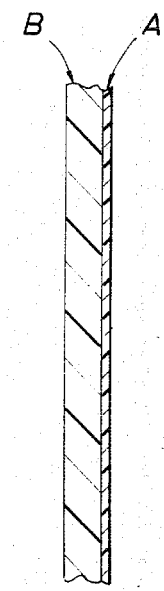
FIG. 3 is a side view of the outer layer blend of polymers which is laminated to the inner layer blend of polymers.

FIG. 3 shows the layer structure of the inner and outer polymer blends.

The outer layer blend comprises amounts of polypropylene copolymer and polybutene-1 copolymer which are sufficient to lend desirable film thickness as well as desirable autoclavable and drop test results. The polypropylene copolymer of the outer layer blend comprises from about 50% by weight to about 95% by weight propylene-ethylene copolymer or propylene homopolymer and is preferably from about 85% by weight to about 90% by weight propylene-ethylene copolymer or propylene homopolymer. The polybutene-1 copolymer of the outer layer blend comprises from about 5% by weight to about 50% by weight butene-1-ethylene copolymer and is preferably from about 10% to about 15% by weight butene-1-ethylene copolymer. The inner layer blend comprises amounts of polypropylene copolymer and polybutene-1 copolymer which are sufficient to lend desirable film thickness as well as desirable autoclavable and drop test results.

The propylene copolymer of the inner layer blend comprises from about 10% by weight to about 40% by weight propylene-ethylene copolymer or propylene homopolymer and the polybutene-1 copolymer of the inner layer blend comprises from about 60% by weight to about 90% by weight butene-1-ethylene copolymer. The polypropylene copolymer of the inner layer blend preferably comprises from about 10% by weight to 15% by weight propylene-ethylene copolymer or propylene homopolymer and the polybutene-1 copolymer of the inner layer blend preferably from about 85% by weight to about 90% by weight butene-1-ethylene copolymer.

The propylene-ethylene copolymer of the outer layer blend as well as the inner blend comprises from about 0% by weight to about 8% by weight of the ethylene content and the butene-1-ethylene copolymer comprises from about 2% by weight to about 8% by weight of the ethylene content. The propylene-ethylene copolymer preferably comprises 3% by weight ethylene content and the butene-1-ethylene copolymer comprises preferably about 5% by weight ethylene content.

Both the polybutene-1 copolymer and polypropylene copolymer of the outer layer blend and the polybutene-1 and the polypropylene copolymer of the inner layer blend should be random copolymers. The inner layer B is coextruded with outer layer A as shown in FIG. 3. The thickness of inner layer B to outer layer A is from about 1:1 to about 6:1 and preferably about 4:1.

Suggested hot bar sealing conditions are where the coextruded blend of polymers are at a temperature of 340° F. to 360° F., and where both sides of the package are heated with the use of Teflon cloths. Three to 3.5 seconds is a sufficient dwell time at a pressure of 20-30 psi.

As may be seen in FIG. 4 and FIG. 5, as the ethylene content increases, the seal drop test and film drop test results are better. All data are based on two mil blown film.

Figure 6:
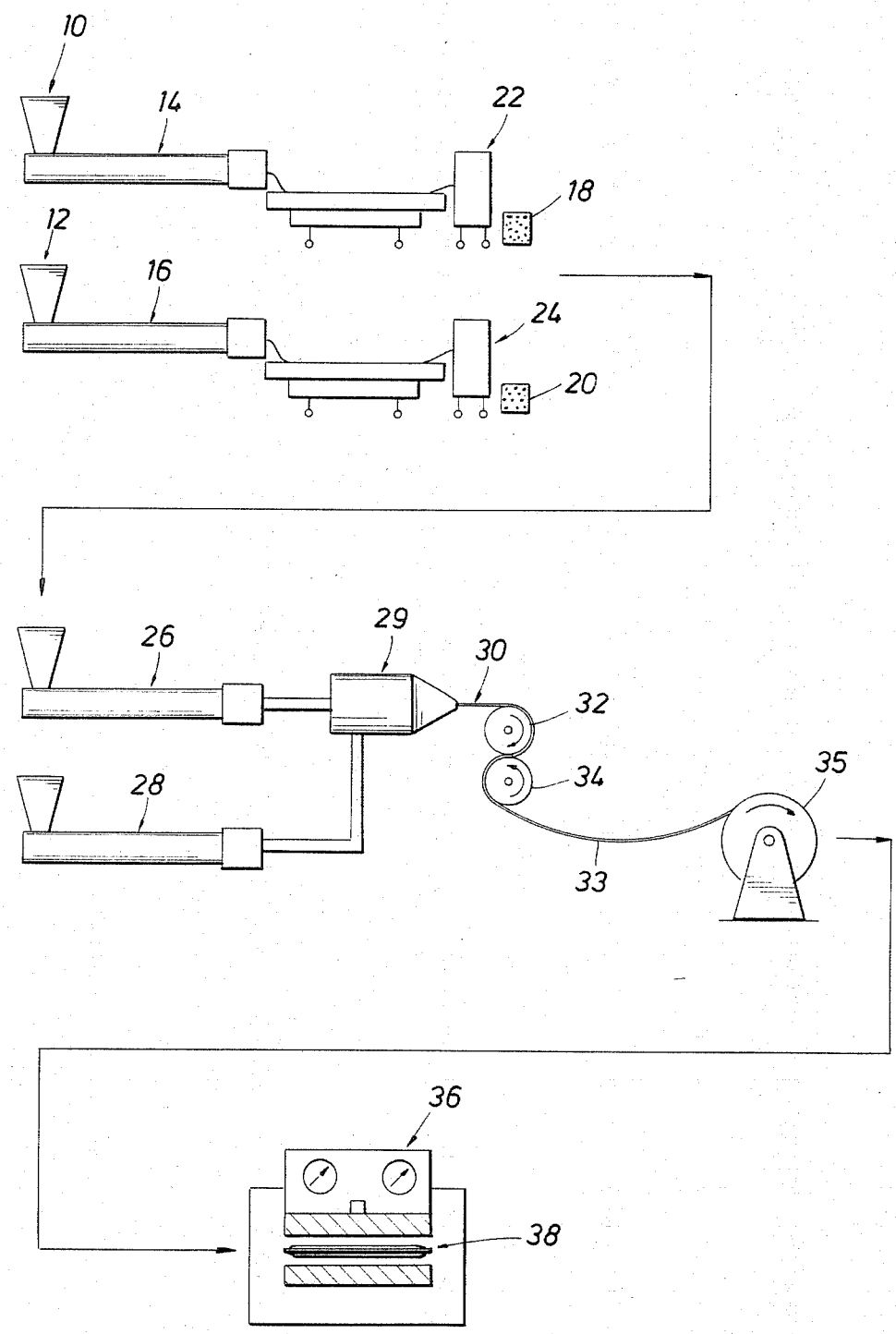
FIG. 6 illustrates the steps in producing a package according to this invention.

FIG. 6 illustrates the steps in the method for producing a package according to this invention. In accordance with this method, from about 85% by weight to about 90% by weight propylene copolymer and from about 10% by weight to about 15% by weight butene-1 copolymer are mixed together in the form of pellets and then extruded at a melt temperature of about 400° F. to 500° F. Separately, a mix of from about 10% by weight to about 15% by weight propylene copolymer and from about 85% by weight to about 90% by weight butene-1 copolymer is prepared from pellets of the copolymers and is extruded at a melt temperature of 380° F. to 450° F. The two mixes of propylene copolymer and butene-1 copolymer pellets are initially contained in hopper 10 and hopper 12 where they are respectively extruded through extruder 14 (the inner blend) and extruder 16 (the outer blend). The resulting propylene/butene-1 copolymer 18 and butene-1/propylene copolymer 20 are each separately pelletized through pelletizers 22 and 24, respectively. The resulting pellets of each are separately extruded through extruders 26 and 28, respectively, and through coextrusion die 29 into sheets 30. Coextrusion die 29 may be of the slot or circular type. The coextrusion die 29 is at approximately 380° F. to 500° F. Coextruded sheets 30 are passed between chilled rollers 32 and 34, respectively, to cool and flatten said coextruded sheets 30. The rollers 32 and 34 may be chilled by filling them with cold water. The cooled and flattened sheets 33 are wound on a take-up device 35 and are then sealed on at least two sides by a sealing device 36 to produce the desired package 38.

The two-layer blend that is the subject of this invention (WBS-289) was tested for comparison with the PVC material usually used. The PVC IV solution bag was supplied by Abbott Laboratories, while the polybutylene/polypropylene blends of this invention were extrusion melt compounded and fabricated into film by a film casting process. The results of such comparison testing may be seen in Table 1 below. The corresponding ASTM test number is included next to each test, unless the test is one that is recognized as standard in the industry. The bag drop test results in Table 1 are for the blown tube sealed on four sides and testing was conducted after the autoclave experiments.

TABLE I
COMPARISON OF SHELL WBS-289 BLEND WITH PVC FOR INTRAVENOUS SOLUTION BAGS

| ASTM TEST NO. | TEST DESCRIPTION | WBS 289 | VINYL (PVC) |
|---|---|---|---|
| — | Film Thickness, cm | 0.025 (10 mil) | 0.038 (15 mil) |
| — | Density, g/cm$^3$ | 0.91 | 1.27 |
| E96 | Water vapor transmission Rate/g/m$^2$/24 hrs. | 3.10 | 21.70 |
| — | USP Class VI method extractables, mg/cm$^2$ | | |
| | Total by water | 0.00020 | 0.0020 |
| | Chloroform | 0.00000 (cannot detect) | 0.00069 |
| D1003 | Film Haze, % | 33 | 10 55 (Embossed) |
| — | Autoclave @ 121° C. | Pass | Pass |
| — | Bag Drop Test (1000 cc, 183 cm Height) | Pass | Pass |
| D882 | Secant Modulus (2%)* kg/cm$^2$ | 1400 | 478 |
| D882 | Tensile Break,* kg/cm$^2$ | 232 | 246 |
| D1003 | Haze, %, Presterilization (two plys & wet) not embossed | 34 | 18 |
| | Embossed | | 31 |
| D1003 | Haze, %, Post Sterilization (two plys & wet) Not Embossed | 73 | 79 |
| D882 | Seal Strength*, kg/cm$^2$ | 180 | 124 |

*= thickness corrected

As may be seen in Table 1, the polybutylene/polypropylene blend (WBS-289) exhibited far better values in water vapor transmission resistance, had much less extractables, and greater seal strength demonstrated by the lower film thickness and density values, than the values exhibited by the vinyl (PVC).

Autoclavability at 121° C. was successful for WBS-289 as was the Bag Drop Test. The WVTR has been decreased seven-fold, and the extractables have been decreased ten-fold for total by water and more than five hundred-fold for chloroform (CANNOT DETECT). The film thickness has been reduced from 15 ml to 10 ml and the density lowered by more than one-third, which results in a substantial savings of material cost, as may be seen in Table II, below.

TABLE II

| MATERIAL | THICKNESS, mil | DENSITY, G/CM$^3$ |
|---|---|---|
| WBS-289 | 10 | 0.91 |
| VINYL (PVC) | 15 | 1.27 |
| SAVINGS WBS-289 | 33% | 28% |
| TOTAL SAVINGS = MATERIAL COST | 61% | |

What is claimed is:
1. A package for containing blood and/or intravenous solutions, which comprises:
an outer layer blend of from about 50% by weight to about 95% by weight propylene-ethylene copolymer or propylene homopolymer, where the ethylene content of said propylene-ethylene copolymer comprises from about 0% by weight to about 8% by weight of said propylene-ethylene copolymer, and from about 5% by weight to about 50% by weight butene-1-ethylene copolymer, where the ethylene content of said butene-1-ethylene copolymer comprises from about 2% by weight to about

8% by weight of said butene-1-ethylene copolymer; and an inner layer blend of from about 10% by weight to about 40% by weight propylene-ethylene copolymer or propylene homopolymer, where the ethylene content of said propylene-ethylene copolymer comprises from about 0% by weight to about 8% by weight of said propylene-ethylene copolymer, and from about 60% by weight to about 90% by weight butene-1-ethylene copolymer, where the ethylene content of said butene-1-ethylene copolymer comprises from about 2% by weight to about 8% by weight of said butene-1-ethylene copolymer, and where the thickness ratio of said inner layer to said outer layer is from about 1:1 to about 6:1.

2. The package of claim 1, wherein said polybutene-1 copolymer and said polypropylene copolymers of said outer layer blend and said copolymers of said inner layer blend are random copolymers.

3. The package of claim 1, wherein said inner layer is coextruded with said outer layer.

4. The package of claim 1, wherein the thickness ratio of said inner layer to said outer layer is from about 2:1 to about 4:1.

5. The package of claim 1, wherein the thickness ratio of said inner layer to said outer layer is preferably about 4:1.

6. The package of claim 1, wherein said outer layer blend comprises from about 75% by weight to about 90% by weight propylene-ethylene copolymer or propylene homopolymer and said outer layer blend comprises from about 10% by weight to about 25% by weight butene-1-ethylene copolymer.

7. The package of claim 1, wherein said outer layer blend comprises from about 85% by weight to about 90% by weight propylene-ethylene copolymer or propylene homopolymer and said outer layer blend comprises from about 10% to about 15% by weight butene-1-ethylene copolymer.

8. The package of claim 1, wherein said inner layer blend comprises from about 10% by weight to about 25% by weight propylene-ethylene copolymer or propylene homopolymer and said inner layer blend comprises from about 75% by weight to about 90% by weight butene-1-ethylene copolymer.

9. The package of claim 1, wherein said inner layer blend comprises from about 10% by weight to about 15% by weight propylene-ethylene copolymer or propylene homopolymer and said inner layer blend comprises from about 85% by weight to about 90% by weight butene-1-ethylene copolymer.

10. The package of claim 1, wherein the ethylene content of said propylene-ethylene copolymer comprises from about 1% by weight to about 6% by weight of said propylene-ethylene copolymer and where the ethylene content of said butene-1-ethylene copolymer comprises from about 3% by weight to about 6% by weight of said butene-1-ethylene copolymer.

11. The package of claim 1, wherein the ethylene content of said propylene-ethylene copolymer comprises preferably about 3% by weight of said propylene-ethylene copolymer and where the ethylene content of said butene-1-ethylene copolymer comprises preferably about 5% by weight of said butene-1-ethylene copolymer.

12. A package for containing blood and/or intravenous solutions, which comprises:

an outer layer blend of from about 75% by weight to about 90% by weight propylene-ethylene copolymer, where the ethylene content of said propylene-ethylene copolymer comprises from about 2% by weight to about 6% by weight of said propylene-ethylene copolymer, and from about 10% by weight to about 25% by weight butene-1-ethylene copolymer, where the ethylene content of said butene-1-ethylene copolymer comprises from about 3% by weight to about 6% by weight of said butene-1-ethylene copolymer; and an inner layer blend of from about 10% by weight to about 25% by weight propylene-ethylene copolymer, where the ethylene content of said propylene-ethylene copolymer comprises from about 2% by weight to about 6% by weight of said propylene-ethylene copolymer, and from about 75% by weight to about 90% by weight butene-1-ethylene copolymer, where the ethylene content of said butene-1-ethylene copolymer comprises from about 3% by weight to about 6% by weight of said butene-1-ethylene copolymer, where said inner layer is coextruded with said outer layer, and the thickness ratio of said inner layer to said outer layer is from about 2:1 to about 5:1.

13. The package of claim 12, wherein said copolymers of said outer layer blend and said copolymers of said inner layer blend are random copolymers.

14. The package of claim 12, wherein the thickness ratio of said inner layer to said outer is preferably about 4:1.

15. The package of claim 12, wherein said outer layer blend comprises from about 85% by weight to about 90% by weight propylene-ethylene copolymer and from about 10% by weight to about 15% by weight butene-1-ethylene copolymer, where the ethylene content of said propylene-ethylene copolymer comprises preferably about 3% by weight of said propylene-ethylene copolymer and where the ethylene content of said butene-1-ethylene copolymer comprises preferably about 5% by weight of said butene-1-ethylene copolymer.

16. The package of claim 12, wherein said inner layer blend comprises from about 10% by weight to about 15% by weight propylene-ethylene copolymer and from about 85% by weight to about 90% by weight butene-1-ethylene copolymer, where the ethylene content of said propylene-ethylene copolymer comprises preferably about 3% by weight of said propylene-ethylene copolymer and where the ethylene content of said propylene-ethylene copolymer comprises preferably about 3% by weight of said propylene-ethylene copolymer, and where the ethylene content of said butene-1-ethylene copolymer comprises preferably about 5% by weight of said butene-1-ethylene copolymer 17. The package of claim 12, wherein said polypropylene copolymer of said inner layer blend comprises from about 10% by weight to about 15% by weight propylene-ethylene copolymer, where the ethylene content of said propylene-ethylene copolymer comprises preferably about 3% by weight of said propylene-ethylene copolymer, and where said inner layer blend comprises from about 85% by weight to about 90% by weight butene-1-ethylene copolymer, where the ethylene content of said butene-1-ethylene copolymer comprises preferably about 5% by weight of said butene-1-ethylene copolymer.

18. A package for containing blood and/or intravenous solutions, which comprises:

an outer layer blend of from about 85% by weight to about 90% by weight propylene-ethylene copolymer, where the ethylene content of said propylene-ethylene copolymer comprises preferably about 3% by weight of said propylene-ethylene copolymer, and from about 10% by weight to about 15% by weight of butene-1-ethylene copolymer, where the ethylene content of said butene-1-ethylene copolymer comprises preferably about 5% by weight of said butene-1-ethylene copolymer; and and an inner layer blend of from about 10% by weight to about 15% by weight propylene-ethylene copolymer, where ethylene content of said butene-1-ethylene copolymer comprises preferably about 5% by weight of said propylene-ethylene copolymer, and from about 85% by weight to about 90% by weight of butene-1-ethylene copolymer, where the ethylene content of said butene-1-ethylene copolymer comprises preferably about 3% by weight of said butene-1-ethylene copolymer, where said inner layer is coextruded with said outer layer, said copolymers of said outer layer blend and said inner layer blend are random copolymers, and the thickness ratio of said inner layer to said outer layer is preferably about 4:1.

19. A package for containing blood and/or intravenous solutions, made by the process which comprises:

extruding a mixture of from about 65% by weight to about 90% by weight propylene-ethylene copolymer or homopolymer and from about 10% by weight to about 35% by weight butene-1-ethylene copolymer into a Compound A;

extruding a mixture of from about 10% by weight to about 35% by weight propylene-ethylene copolymer or homopolymer and from about 65% by weight to about 90% by weight butene-1-ethylene copolymer into a Compound B;

pelletizing said Compound A and separately pelletizing said Compound B;

further extruding said pellets of said Compound A and separately extruding said pellets of said Compound B through a coextrusion die into coextruded sheets or tubes;

passing said coextruded sheets through chilled rollers to cool and through said coextruded sheets or inflating said tubes with air and collapsing said inflated tubes;

winding said cooled and flattened sheets or tubes on a take-up device; and sealing said wound sheets or tubes on at least two sides to produce the desired package.

* * * * *